US012333256B2

(12) United States Patent
Ho et al.

(10) Patent No.: US 12,333,256 B2
(45) Date of Patent: Jun. 17, 2025

(54) AUTHORING A CONVERSATION SERVICE MODULE FROM RELATIONAL DATA

(71) Applicant: INTERNATIONAL BUSINESS MACHINES CORPORATION, Armonk, NY (US)

(72) Inventors: Tin Kam Ho, Millburn, NJ (US); Vadim Sheinin, Yorktown Heights, NY (US); Elahe Khorasani, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 17/322,796

(22) Filed: May 17, 2021

(65) Prior Publication Data

US 2022/0366147 A1  Nov. 17, 2022

(51) Int. Cl.
*G06F 40/35* (2020.01)
*G06F 16/22* (2019.01)
*G06F 16/242* (2019.01)
*G06F 16/2452* (2019.01)
*G06F 16/3329* (2025.01)
(Continued)

(52) U.S. Cl.
CPC ............ *G06F 40/35* (2020.01); *G06F 16/221* (2019.01); *G06F 16/2423* (2019.01); *G06F 16/243* (2019.01); *G06F 16/2448* (2019.01); *G06F 16/24522* (2019.01); *G06F 16/3329* (2019.01); *H04L 51/02* (2013.01); *G06F 40/56* (2020.01)

(58) Field of Classification Search
None
See application file for complete search history.

(56) References Cited

U.S. PATENT DOCUMENTS

| 8,510,327 | B2 | 8/2013 | Boguraev et al. |
| 9,959,311 | B2 | 5/2018 | Boguraev et al. |
| 10,042,921 | B2 | 8/2018 | Boguraev et al. |

(Continued)

FOREIGN PATENT DOCUMENTS

| CN | 115374146 A | 11/2022 |
| JP | 2022176922 A | 11/2022 |

OTHER PUBLICATIONS

Botsify, "Conversational Forms", Accessed Oct. 18, 2023, https://botsify.com/conversational-forms#0, 7 pages.

(Continued)

*Primary Examiner* — Richa Sonifrank
(74) *Attorney, Agent, or Firm* — Kristofer Haggerty

(57) ABSTRACT

A method of authoring a conversation service for a chatbot and a database includes receiving, from a user, a selection of a database, and connecting an authoring service of the chatbot to a table in the database; outputting, from the authoring service to the user, a question requesting a description of a subject matter of the table; receiving the description of the subject matter of the table; outputting to the user a question requesting an identification of a key column of the table that contains values that represent the subject matter of the table; receiving the identification of the key column of the table; and translating, by a natural language query service, the description of the subject matter of the table and the key column of the table into the conversation service, wherein the conversation service includes SQL statements suitable for querying the database table.

13 Claims, 14 Drawing Sheets

(51) Int. Cl.
  *G06F 40/56*    (2020.01)
  *H04L 51/02*    (2022.01)

(56) References Cited

U.S. PATENT DOCUMENTS

| | | | |
|---|---|---|---|
| 10,120,863 B2 | 11/2018 | Popescu et al. | |
| 10,169,333 B2 | 1/2019 | Popescu et al. | |
| 10,235,429 B2* | 3/2019 | Meehan | G06F 16/248 |
| 10,282,411 B2 | 5/2019 | Popescu et al. | |
| 10,380,258 B2 | 8/2019 | Popescu et al. | |
| 10,664,472 B2 | 5/2020 | Burceanu | |
| 11,163,837 B2* | 11/2021 | Ray | G06F 16/248 |
| 11,567,941 B1* | 1/2023 | Chimanchode | G06F 16/2456 |
| 11,575,624 B2* | 2/2023 | Taylor | G06F 40/40 |
| 11,693,855 B2 | 7/2023 | Khorasani | |
| 2017/0315979 A1* | 11/2017 | Boucher | G06Q 10/101 |
| 2018/0024272 A1* | 1/2018 | Spyropoulou | G01W 1/17 702/3 |
| 2018/0268025 A1* | 9/2018 | Bandyopadhyay | G06F 16/2452 |
| 2019/0065528 A1* | 2/2019 | Jin | G06F 16/29 |
| 2019/0340240 A1* | 11/2019 | Duta | G06V 30/15 |
| 2019/0362009 A1* | 11/2019 | Miseldine | G06F 16/9032 |
| 2020/0073989 A1* | 3/2020 | Valentin | G06F 16/248 |
| 2020/0251111 A1* | 8/2020 | Temkin | G06F 16/2423 |
| 2020/0301939 A1* | 9/2020 | Hollander | G06F 16/2471 |
| 2020/0334272 A1* | 10/2020 | Hrastnik | G06F 16/245 |
| 2021/0019309 A1* | 1/2021 | Yadav | G06F 16/2428 |
| 2021/0342785 A1* | 11/2021 | Mann | G06F 40/186 |
| 2021/0390099 A1* | 12/2021 | Rahmfeld | G06F 16/26 |
| 2022/0044134 A1* | 2/2022 | Joy | G06N 3/045 |
| 2022/0060817 A1* | 2/2022 | Sonifrank | H04R 1/227 |
| 2022/0076668 A1* | 3/2022 | Carbune | G10L 15/063 |
| 2023/0072511 A1* | 3/2023 | Wu | G06Q 50/186 |

OTHER PUBLICATIONS

Github, "salesforce/WikiSQL", Accessed: Oct. 18, 2023, https://github.com/salesforce/WikiSQL, 12 pages.

Lin, "Talk to Your Data: One Model, Any Relational Database", Salesforce AI Research, Accessed: Oct. 18, 2023, https://blog.einstein.ai/talk-to-your-data-one-model-any-database/, 12 pages.

Montgomery et al., "Towards a Natural Language Query Processing System", 2020 1st International Conference on Big Data Analytics and Practices (IBDAP) IEEE, Published: Sep. 25, 2020, 6 pages.

Muller, "Using Neural Networks to Find Answers in Tables," Google AI Blog, Apr. 30, 2020, https://ai.googleblog.com/2020/04/using-neural-networks-to-find-answers.html, 4 pages.

Neves et al., "Demonstrating AI-enabled SQL Queries over Relational Data using a Cognitive Database. Knowledge Discovery and Data Mining," KDD'18 Deep Learning Day, Aug. 2018, ACM, 9 pages.

Owda et al., "Information Extraction for SQL Query Generation in the Conversation-Based Interfaces to Relational Databases (C-BIRD)," KES International Symposium on Agent and Multi-Agent Systems: Technologies and Applications, Jun. 2011, 10 pages.

Read, "5 Ecommerce Chatbots (Plus How to Build Your Own in 15 Minutes)" Dec. 6, 2021, https://sumo.com/stories/ecommerce-chatbot-marketing, 20 pages.

Sun et al., "Knowledge-Aware Conversational Semantic Parsing Over Web Tables," arXiv:1809.04271v1 [cs.CL] Sep. 12, 2018, 9 pages.

Wang et al., "A Transfer-Learnable Natural Language Interface for Databases," arXiv:1809.02649v1 [cs.AI] Sep. 7, 2018, 8 pages.

Yost, "AWS Machine Learning Blog. Building a conversational business intelligence bot with Amazon Lex," Amazon Lex, Artificial Intelligence, Nov. 21, 2018, https://aws.amazon.com/blogs/machine-learning/building-a-conversational-business-intelligence-bot-with-amazon-lex/, 12 pages.

Youtube, "Chatfuel Overview", Accessed: Oct. 18, 2023, https://youtu.be/SCLByG57zFQ, 2 pages.

https://docs.chatfuel.com/en/articles/2310939-1-automate-conversations.

https://support.morph.ai/portal/kb/articles/facebook-how-to-build-an-e-commerce-chatbot.

* cited by examiner

| DBA | BORO | STREET | ZIPCODE | PHONE | CUISINE |
|---|---|---|---|---|---|
| First Chinese | Manhattan | AA St. | 100XX | 212-YYY-ZZZZ | Chinese |
| Second Chinese | Brooklyn | BB Rd. | 112XX | 718-YYY-ZZZZ | Chinese |
| First Juice | Queens | CC Ave. | 113XX | 718-YYY-ZZZZ | Juice, Smoothies, Fruit Salads |
| First Latino | Bronx | DD Rd. | 104XX | 718-YYY-ZZZZ | Latino (Cuban, Dominican Puerto Rican, Central & South American |
| First Pizza | Bronx | EE Ave. | 104XX | 718-YYY-ZZZZ | Pizza |
| Second Pizza | Manhattan | FF Ave. | 100XX | 212-YYY-ZZZZ | Pizza |
| Third Pizza | Brooklyn | GG St. | 112XX | 718-YYY-ZZZZ | Pizza |
| Third Chinese | Brooklyn | HH Ave. | 112XX | 718-YYY-ZZZZ | Chinese |
| Fourth Pizza | Manhattan | II St. | 100XX | 212-YYY-ZZZZ | Pizza |
| Fifth Pizza | Manhattan | JJ St. | 100XX | 212-YYY-ZZZZ | Pizza |
| First Italian | Manhattan | KK St. | 100XX | 212-YYY-ZZZZ | Italian |

FIG. 3

AUTHORING A CONVERSATION SERVICE MODULE FROM RELATIONAL DATA

TECHNICAL FIELD

Embodiments of the disclosure are directed to automated conversation services, such as chatbots.

DISCUSSION OF THE RELATED ART

Automated conversation services, such as chatbots, are becoming popular in enterprise customer services, as they can replace much human labor in the handling of simple customer requests. However, how to define a conversation service remains a challenge, as the complex programming interfaces offered by some vendors are challenging to use by domain experts who often do not have sufficient computing training in those interfaces, and intuitive graphical user interfaces available today are often limited in their ability to define different types of target requests a client can address. A substantial part of customer requests are information queues that can be answered with items listed in a data table or a conventional relational database. Examples are flight schedules, product features, release dates, service ticket status, etc.

Existing tools that allow clients to define chatbots typically assume that a dialog requires intents, slots, and prompts. Intents specify the basic fora of the request, slots are parameter values to be solicited from the end user, and prompts are utterances for how those values should be asked for. Some vendors are creating other specialized ways for defining bots, such as various forms to be filled or customized with expected questions and suitable answers or actions. There have also been various efforts on designing natural language query (NLQ) interfaces to databases, which cover detailed techniques on bow to build up a translation tool that maps a natural language query to a structured database query in a standard language like SQL.

However, the intents, slots/entities, and prompts or dialog tree models for authoring chatbots are too low level, They require a client to break down each expected end-user query into such elements. They are tedious to use and challenging to scale up for any combinations of questions that can be answered with a large database. Question/answer definitions driven by analyzing imported documents are limited to text-oriented questions. For data oriented questions, these documents often produce only an encompassing text passage instead of a precise answer. Other specialized chatbot authoring tools are also limited to types of data and dialog flows that are suitable for narrow domains, such as e-Commerce, and do not work for general domains. The work on NLQ technologies focus much on the details of the translation methods but less on how to interact with clients who need to set up such a service by themselves and need to offer their descriptions of the data according to their domain knowledge.

SUMMARY

Embodiments of the disclosure are directed to an intuitive way for clients to author a conversation service for data-oriented customer requests.

According to an embodiment of the disclosure, there is provided a method of authoring a conversation service for a chatbot and a database, the method including, receiving, from a user, a selection Of a database, and connecting are authoring service of the chatbot to a table in the database, wherein the table comprises a plurality of rows and a plurality of columns; outputting, from the authoring service to the user, a question requesting a description of a subject matter of the table; receiving, by the authoring service, the description of the subject matter of the table; outputting, from the authoring service to the user, a question requesting an identification of a key column of the table that contains values that represent the subject matter of the table; receiving, by the authoring service, the identification of the key column of the table; and translating, by a natural language query service, the description of the subject matter of the table and the key column in the table into the conversation service, wherein the conversation service includes SQL statements suitable for querying the database table.

According to a further embodiment of the disclosure, the method includes outputting, from the authoring service to the user, a question requesting a description of another column of the table; and receiving, by the authoring service, a natural language description of another column in the table, wherein the natural language description of another column in the table is translated by a natural language query service into the conversation service.

According to a further embodiment of the disclosure, the steps of outputting, from the authoring service to the user, a question requesting a description of another column of the table and receiving, by the authoring service, a natural language description of another column in the table are repeated for each column in the table.

According to a further embodiment of the disclosure, the method includes outputting, from the authoring service to the user, feedback that summarizes the description of the subject matter of the table, the identification of the key column of the table, and the natural language description of another column in the table.

According to a further embodiment of the disclosure, the method includes outputting, from the conversation service to the user, a prompt for a question from the user that concerns the subject matter of the table; receiving from the user a question that concerns the subject matter of the table; outputting, from the conversation service, an answer to the question received from the user; and receiving from the user an indication of whether the answer is correct, only partially correct, or incorrect.

According to a further embodiment of the disclosure, the method includes, in response to an incorrect or partially correct answer, repeating the steps of outputting, from the authoring service to the user, a question requesting an alternative description of the subject matter of the table or another column of the table and receiving, by the authoring service, a natural language description of the subject matter of the table or another column in the table, for one or more columns of the table, and translating the description of the subject matter of the table and the natural language description of the one or more columns in the table into the conversation service.

According to another embodiment of the disclosure, there is provided a system of authoring a conversation service for a chatbot and a database, including a chatbot; an authoring service that guides a user through a process of building the conversational service for the chatbot; a database wherein the database contains a table to which the authoring service is connected; and a natural language query service that performs natural language processing on answers provided by the user to the authoring service and generates SQL queries for the database service. The authoring service outputs to the user a question requesting a description of a subject matter of the table, receives from the user the description of the subject matter of the table, outputs to the user a question requesting are identification of a key column of the table that contains values that represent the subject matter of the table, receives from the user the identification of the key column of the table, and the natural language query service translates the description of the subject matter of the table and the key column into the conversation service, wherein the conversation service includes SQL statements suitable for querying the database table.

According to a further embodiment of the disclosure, the authoring service outputs to the user a question requesting a description of another column of the table, and receives from the user a natural language description. of another column in the table, and the natural language query service translates the natural language description of another column in the table into the conversation service.

According to a further embodiment of the disclosure, the system includes a graphical user interface through which the user communicates with the chatbot and the authoring service, and cloud storage.

According to a further embodiment of the disclosure, the authoring service repeats outputting to the user a question requesting an alternative description of the subject matter of the table or another column of the table and receiving from the user a natural language description of the subject matter of the table or another column in the table for each column in the table.

According to a further embodiment of the disclosure, the authoring service outputs to the user feedback that summarizes the description of the subject matter of the table, the identification. of the key column of the table, and the natural language description of another column in the table.

According to a further embodiment of the disclosure, the conversation service outputs to the user a prompt for a question from the user that concerns the subject matter of the table, receives from the user a question that concerns the subject matter of the table, outputs to the user an answer to the question received from the user; and receives from the user an indication of whether the answer is correct, only partially correct, or incorrect.

According to a further embodiment of the disclosure, the authoring service repeats, in response to an incorrect or partially correct answer, steps of outputting, from the authoring service to the user, a question requesting an alternative description of the subject matter of the table or another column of the table and receiving, by the authoring service, a natural language description of the subject matter of the table or another column in the table, for one or more columns of the table, and the natural language query service translates the description of the subject matter of the table and the natural language description of the one or more columns in the table into the conversation service.

According to another embodiment of the disclosure, there is provided a non-transitory program storage device readable by a computer, tangibly embodying a program of instructions executed by the computer to perform a method of authoring a conversation service for a chatbot and a database.

BRIEF DESCRIPTION OF THE DRAWINGS

FIG. 3 illustrates a portion of a table from an exemplary database, according to an embodiment.

DETAILED DESCRIPTION OF EXEMPLARY EMBODIMENTS

Figure 1:
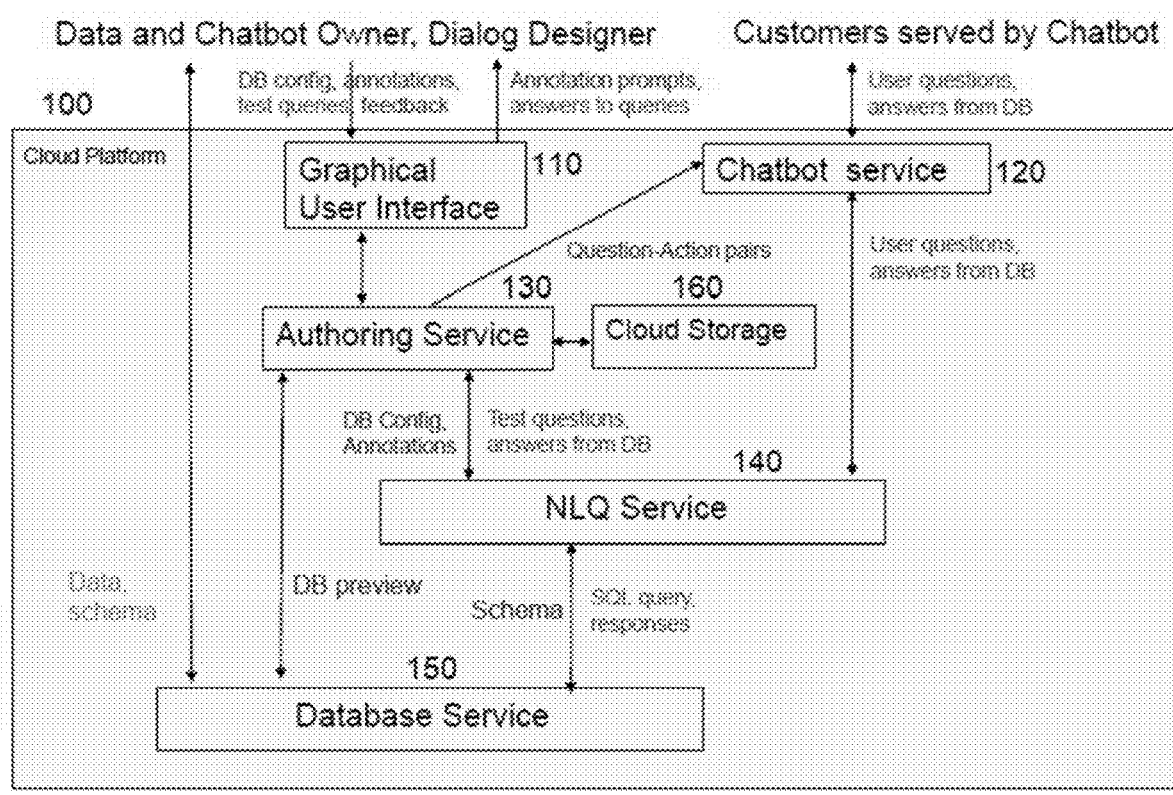
FIG. 1 is a block diagram of an exemplary authoring tool according to an embodiment.

Exemplary embodiments of the disclosure as described herein generally provide augmented reality systems and methods for automated conversation services. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the disclosure provide an interactive authoring tool that allows a client to define a conversation service based on relational data. An authoring tool according to an embodiment is conducted through a dialog that guides the client to (1) specify a connection to a. database, or to import one or more data tables, (2) provide descriptions of the data, and then (3) define multiple conversational que and action modules through an iterative "write, translate, confirm, expand" process. It leverages an NLQ technology to provide the translation of a representative natural language query provided by the client into a structured query language like SQL, plus a re-generated natural language form of the query that is composed from the translated components. The re-generated natural language query allows the client to check the bot's understanding even if the client is not familiar with the SQL syntax. The client can try several variants of the same query until she is satisfied with a correct re-generation. The translated SQL statement can be used in a response action to this set of queries. The set of natural language queries mapped to the same action, along with the response action, can serve as a module in the chatbot service to be triggered when an end-user's utterance matches the natural language queries. Optionally, this set of related natural language queries can be further expanded with paraphrasing or synonym hunting tools to better match other potential variations of the end-user utterance.

An authoring tool according to an embodiment allows for easy construction of a data-oriented conversational service by domain experts who may have little or no programming expertise. It can work for a wide range of databases that are of the entity-instance type, where each row of a table represents an entity, and each column represents an attribute of the entities in the table. An example of a table that is not an entity-instance table is a key-value table for a single object, where each row gives a (key, value) pair for one of this object's properties. However, if one rotates a key-value table clockwise, so that each column describes one key and its value, the table becomes an e City-instance table with a single example. The need for an initial data description is kept minimal for the client to start easily. An authoring tool according to an embodiment offers a process for the client to incrementally refine his data descriptions in order to support more variable forms of the same query.

An authoring tool according to an embodiment includes a user interface, a connection application, and an NLQ technology. FIG. 1 is a block diagram of an exemplary authoring tool according to an embodiment. An authoring tool 100 according to an embodiment may be cloud-based, and includes a chatbot service 120, an authoring service 130 that guides a user through the process of building the conversational service for the chatbot, a database service 150, a graphical user interface (GUI) 110 through which a user communicates with the chatbot service and the authoring service, a natural language query (NLQ) service 140 that performs natural language processing on answers provided by the user to the authoring service and generates SQL queries for the database service, and cloud storage 160. In some embodiments, the authoring service 130 is included in, or provided by, the chatbot service 120. The conversation service created by the is authoring toll of FIG. 1 is provided by the chatbot service 120.

Figure 2:
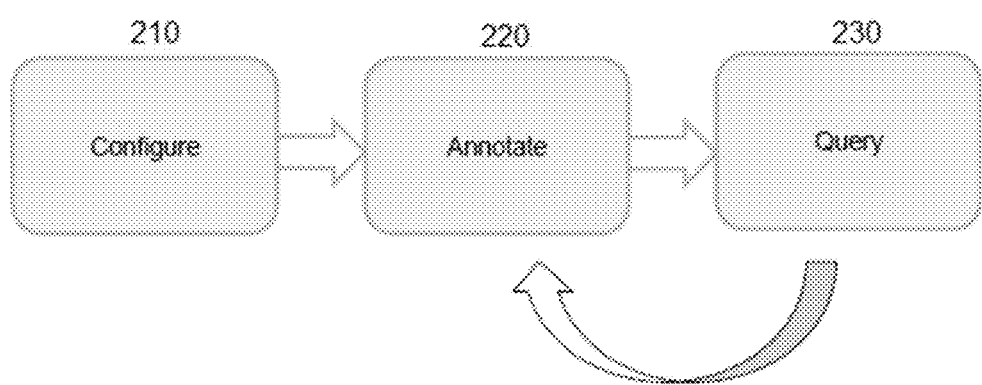
FIG. 2 is a flowchart of the stages of an exemplary authoring tool according to an embodiment.

The tool guides a client through three stages, illustrated in FIG. 2: Configure 210, Annotate 220, and Query 230.

In the Configure step 210, the user selects a database, provides, through the GUI 110, connection details, such as host URL, access credentials, etc., to the authoring sere ice 130 for the database 150, and selects a table from the database. FIG. 3 illustrates a portion of a table from exemplary database, according to embodiment.

In the Annotate step 220, an interactive authoring process controlled by the authoring service 130 presents annotation prompts in the form of questions to the user through the GUI 110 and collects data descriptions from the user through the GUI 110. If the user has previously annotated a table, the user can look for it in a list of databases, and can go directly to the "Query" stage to ask questions. The user can also select it and go to "Annotate" to complete unfinished annotations or make changes.

Note that in the descriptions below of the dialog through the GUI, the word "chatbot" is used to refer to the "authoring" dialog. which is different from the eventual end-user facing chatbot that provides the conversation service being created by the authoring service.

A reason for schema annotation is that words are needed that represent how the entities and their properties are mentioned in natural language, so that the conversation service can understand questions about them. Those words can make up for column headers that could sometimes be incomprehensible to users.

For example, consider a table listing two examples of fruit:

| PROD | COL | MED_CAL |
|------|-----|---------|
| Apple | red | 95 |
| Banana | yellow | 105 |

This table is essentially saying that there is an example of fruit, identified by the name (PROD) as Apple, is of the color (COL) red, and has 95 as the medium calories (MED_CAL). In addition, there is another example of fruit, identified by the name (PROD) as banana, is of the color (COL) yellow, and has 105 as medium calories (MED_CAL).

The table should be interpreted as statements like these, which can be used to produce answers when the focus of a question falls on various parts of the statements. The table provides column labels and entry values that can be harvested. To add to those (sometimes incomprehensible) labels, the user provides the chatbot service with their equivalent natural language words: fruit, name, color, medium calories, etc. With these, questions containing those words can be associated to the relevant columns.

For example, someone may ask: "Which fruit has more than 100 medium calories?" To answer this question, the service need the words "fruit", "medium calories", and the connection that a "fruit" is represented by a "name" listed in the column PROD. With these, the condition can be matched to MED_CAL, and the target PROD value can be retrieved as an answer. Note that the word "fruit" refers to the main subject matter of the table, and it does not need to appear explicitly in the table. The word is needed so that questions like "which fruit . . . " can be understood as asking for a target row. The values in the "PROD" column are used to answer the question, once this column is identified as an identifier far the item described in each row.

Thus, according to an embodiment, to set up a database for use in a conversation, a description of what information the table stores is provided. This may be referred to as a "Schema Annotation" process. It is assumed that the table is a listing of items of a certain type, where each column represents some property of the items. So, the first thing needed is a word that describes the subject matter of the table. What is the table about? It could be a type of things/people/places/events or others.

Once the subject matter is identified, the chatbot needs to know, which column has values that best represent each specific item. Usually this is a column containing names or other unique identifiers for each item. Then, for each column, the chatbot needs some natural language words that are equivalent to the column header. This allows it to know which columns are involved when such words appear in a question.

In addition, the chatbot also wants to know the semantic type of each column, i.e., if the values are about people, locations, dates, etc. These allow it to look in those columns for candidate answers to certain types of questions, e.g., questions led by "who", "where", or "when". For columns containing numbers, it needs to know whether the numbers are suitable for calculation. For example, frequency counts, length, weight . . . , are suitable. But ID numbers, phone numbers, etc., are not.

In the Annotate step 220, an authoring process according to an embodiment starts with two questions for each table:
 (1) the main entity in the table, i.e., what the table is about, and
 (2) the primary key of the table, i.e., which column can best represent an item, such as a row, in the table.

The answers to these questions are not necessarily apparent from the database. For the first question, the user provides one word that describes the subject matter of the table, i.e., what the table is about. For example, if the table lists the name address, menu, etc., of restaurants, the user enters "restaurant". For a product catalog, the user enters "product". Or, the user narrows it down to the type of product, e.g., "toy", if the table lists only toys. For the second question, the user enters which column best represents the item in the row. Usually, this should be the column that contains a name or sonic unique identifier.

In an embodiment, once a user provides answers to these two questions, the user is presented with additional questions that concern special properties of each database column. For each column, that user may provide natural language words that are equivalent to the column header, and may check if the values are in one of the special types, e.g., people, location, money, date, time, or numbers suitable fear calculation. The user may provide synonyms to the words that describe the main entity or its properties, and add the alternative words as labels for the main entity or the columns.

In the Query step 230, the user asks questions to the conversational service through the chatbot 120 to test the conversational service, and receives answers to the questions from the database. The Query step may be omitted.

Once the database columns have been annotated, the user can go to the Query step 230 and start asking questions of the database, or, optionally, continue with the Annotate step 220 to provide natural language synonyms for each column in the table, specify semantic types for the columns, or write statements for how columns in different tables can be mentioned together. The questions asked in the Query step 230 will be translated by a back-end NLQ technology into SQL statements and a re-generated natural language query. The client can confirm that the translation is good, at which point the original question and the translations are saved for use as a "question-action" pair for the chatbot. The pair can be added to the chatbot's definitions as an implicit intent and its associated response, which can be used directly in the chatbot, or after further refinement through the chatbot's tooling. Refinements may include generalizing proper nouns in the question into entity classes or their synonyms, formatting the data answer, or enhancing with additional client-provided variations of the query sentence. If a client finds erroneous translation by the NLQ technology in the Query step 230, she can inspect the translation to check which part of the query was missed, and return to the Annotate step 220 to provide additional annotations to the database, such as additional synonyms of the column names, or fuzzy templates for the entity values. The authoring service outputs to the user a question requesting an alternative description of the subject matter of the table or another column of the table and a natural language description of the subject matter of the table or another column in the table, for one or inure columns of the table. The alternative description of the subject matter of the table and the natural language description of the one or more columns in the table are translated and incorporated into the conversation service. The client can iterate between the Annotate step 220 and the Query step 230 to incrementally build up a rich conversational service for the chatbot to address many different types of questions.

FIGS. 4-14 are screenshots that illustrate an exemplary authoring process dialog for the database table presented in FIG. 3, according to an embodiment. In an embodiment, FIG. 3 is a table of restaurants, called NYC_RESTAURANTS, where each row refers to a specific restaurant, and includes the following columns: "DBA", for the name of the restaurant, "BORO" for the location of the restaurant, "STREET" for the address of the restaurant, "ZIPCODE" for the zip code of the restaurant; "PHONE" for the phone number of the restaurant, and "CUISINE" for the type of cuisine served by the restaurant. Note however, that the use of a restaurant table is exemplary and non-limiting, that the following annotation and query processes can be applied to any database table. In addition, FIGS. 4-9 illustrate an Annotation process, and FIGS. 10-14 illustrate a Query process. An authoring process according to an embodiment is a three-way conversation, involving the user, the authoring service, referred to in the figures as the host, and the chatbot. In FIGS. 4-14, the left side of the screenshot shows the dialog between the user, the host, and the chatbot, while the right side illustrates feedback received by the user from the chatbot and the host.

Figure 4:
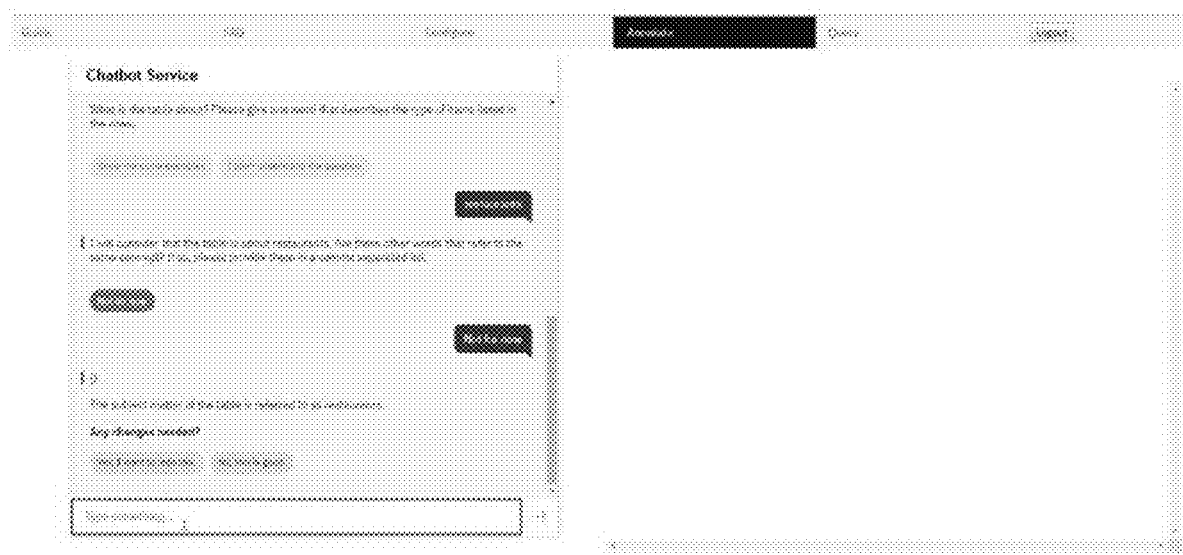
FIGS. 4-12 illustrate an exemplary authoring process, according to an embodiment.

Referring to FIG. 4, as disclosed above, an authoring process starts by having the chatbot service present the following question for each table:
What is the table about? Please give e word that describes the type of items listed in the rows.

Below the question presented by the chatbot are some buttons the use can click on for some built-in answers if she needs more explanation for the question. In the example of FIG. 4, the user enters "restaurants" on the right side of the left column. The chatbot service responds with
I will consider that the table is about restaurants. Are there other words that refer to the same concept? If so, please provide them in a comma-separated list.

The chatbot service also provides a button for "Not for now", which in the example of FIG. 4 is selected by the user.

Figure 5:
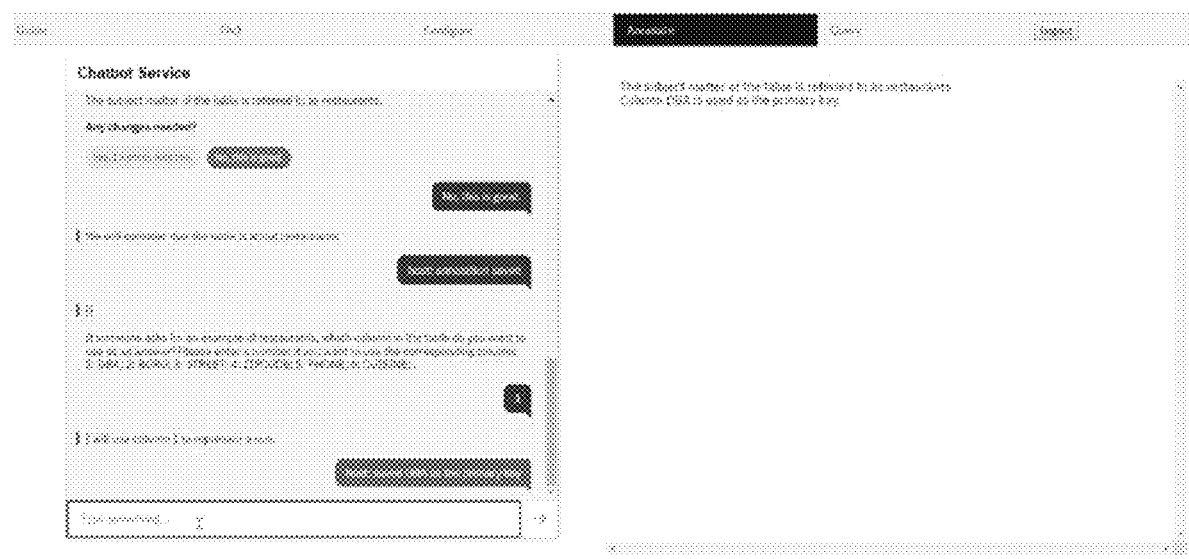

Going from FIG. 4 to FIG. 5, the chatbot service responds with:
The subject matter of the table is referred to as restaurants. Any changes needed? and presents two buttons. In this example, the user selects the "No, this is good" button, after which the chatbot responds with "We will consider that the table is about restaurants" and the host indicates that the annotation has been saved.

According to an embodiment, the chatbot now presents the second question:
If someone asks for an example of restaurants, which column in the table do you want to use as an answer? Please enter a number if you want to use the corresponding column: 1: DBA; 2: BORO: 3: SIREET; 4: ZIPCODE; 5: PHONE; 6; CUISINE.

In this example, the user responds with the number "1". The chatbot service responds with "I will use column 1 to represent a row", and the host indicates that it has saved DBA as the primary key. On the tight side of the screen, the chatbot service provides the following feedback:
The subject matter of the table is referred to as restaurants.
Column DBA is used as the primary key.

Once the subject matter and the primary key of the database table have been provided, the remaining questions of an Annotate process according to an embodiment concern special properties of each database column.

Figure 6:
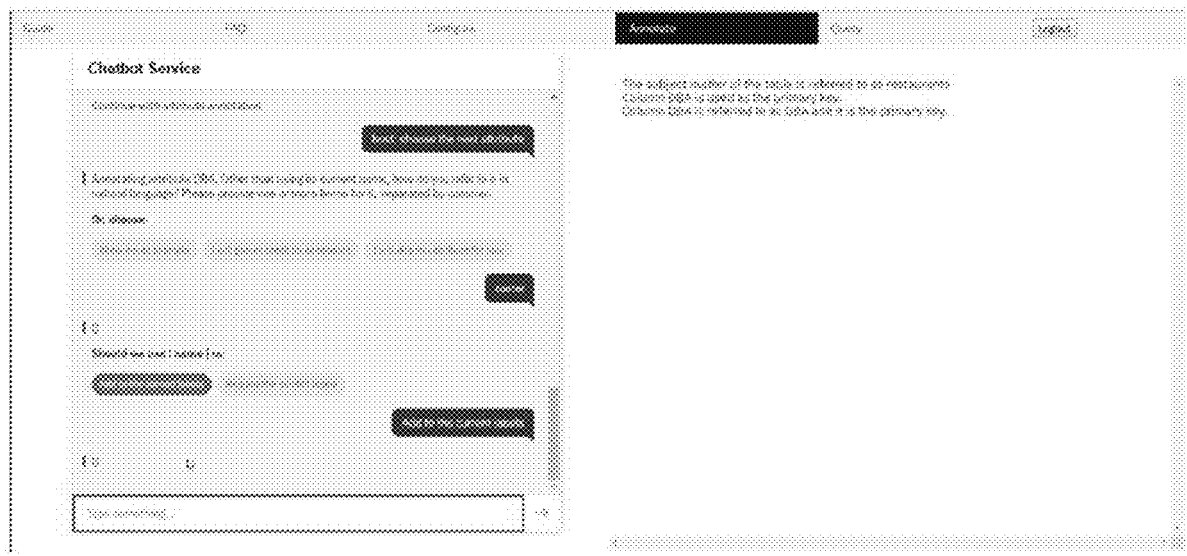

Continuing to FIG. 6, the chatbot service outputs "Continue with attribute annotation", and the host prompts the user with "choose the next attribute". The chatbot service outputs the following feedback to the right side: "Column DBA is referred to as DBA and it is the primary key" and responds on the left side with:
Annotating attribute DBA. Other than using its current name, how do you refer to it in natural language? Please provide one or more terms for it, separated by commas. Or, choose: and presents three buttons. In this example, the user responds by entering "names". The chatbot service responds by outputting "Should we use [name] to" followed by two buttons: one for "Add to the current labels", and one for "Replace the current labels". The user selects the "Add to the current labels" button.

Figure 7:
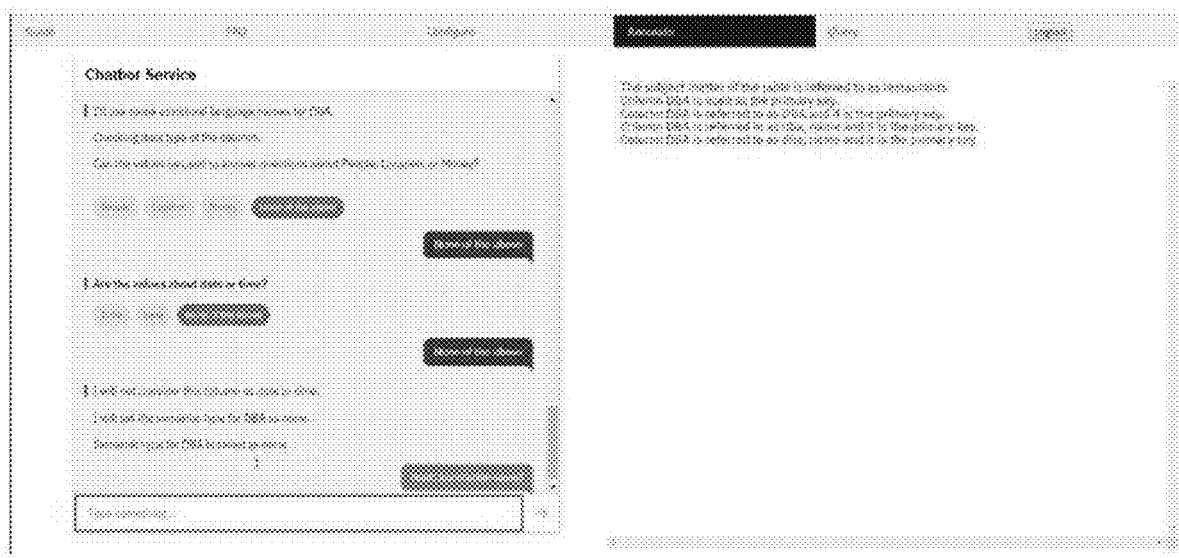

Referring now to FIG. 7, the chatbot service outputs on the right side the following feedback: "Column DBA is referred to as dba, name and it is the primary key", and outputs the following on the left side:
I'll use name as natural language name for DBA.
Checking the data type of the columns.
Can the values be used to answer questions about People, Location or Money?
followed by four buttons. In this example, the user responds by selecting the "None of the above" button. The chatbot then outputs "Are the values about date or time?" followed by three more buttons. The user again selects the "None of the above" button. The chatbot responds by outputting:
I will not consider this column as date or time.
I will set the semantic type for DBA as none.
Semantic type for DBA is saved as none.

The host outputs "annotation saved", and the chatbot outputs to the right side the following feedback: "Column DBA is referred to as dba, name and it is the primary key".

Figure 8:
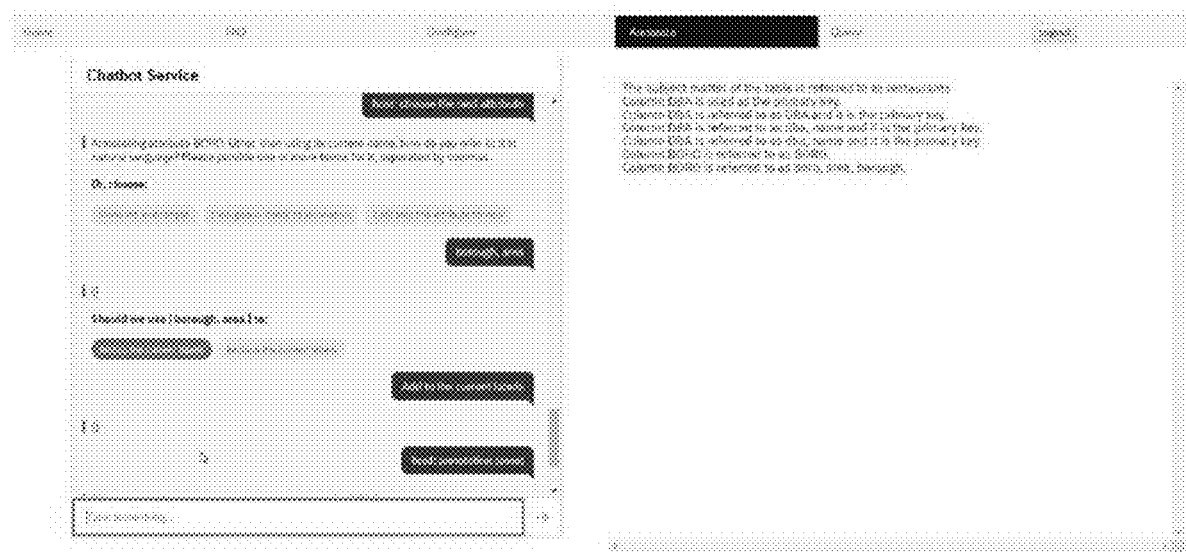

Referring to FIG. 8, the host outputs "choose the next attribute". The chatbot outputs the following feedback to the right side: "Column BORO is referred to as BORO", and outputs the following to the left side:

Annotating, attribute BORO. Other than using its current name, how do you refer to it in natural language? Please provide one or more terms for it, separated by commas.
Or choose:

followed by three buttons. The user, enters "borough, area". The chatbot responds with "Should I use [borough, area] to:" followed by two buttons. The user selects the "Add to the current labels" button. The host responds with "annotation saved", and the chatbot outputs the following feedback to the right side: "Column BORO is referred to as boro, area, borough".

Figure 9:
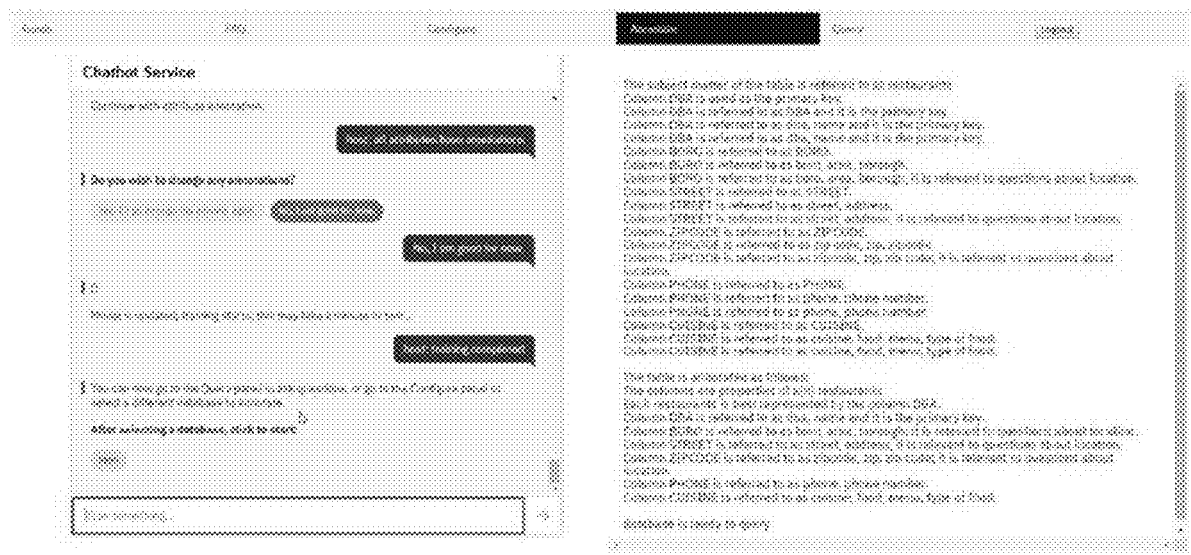

Referring to FIG. 9, the chatbot outputs "Continue with attribute annotation", and the above process is repeated for all columns of the database table. During this process, the chatbot outputs feedback regarding the annotations to the right side. Once all columns have been annotated, the host outputs "all attributes have annotations", and the chatbot outputs "Do you wish to change any annotations?" followed by two buttons. In the example shown in FIG. 9, the use selects "No, I am good for now". The chatbot outputs "Model is updated; training starts; this may take a minute or two . . . ", after which the host outputs "training, completed". During training the NQL service 140, shown in FIG. 1, processes the annotations and generates feedback on the right side of the screen on its use of the annotations to create the internal data that support the conversation service. After the training, the chatbot outputs to the right side a summary of how the table is annotated, and outputs the following prompts to the user on the left side:

You can now go to the Query panel to ask questions or go to the Configure panel to select a different database to annotate.
After selecting a database, click to start"

followed by a "Start: button.

Figure 10:
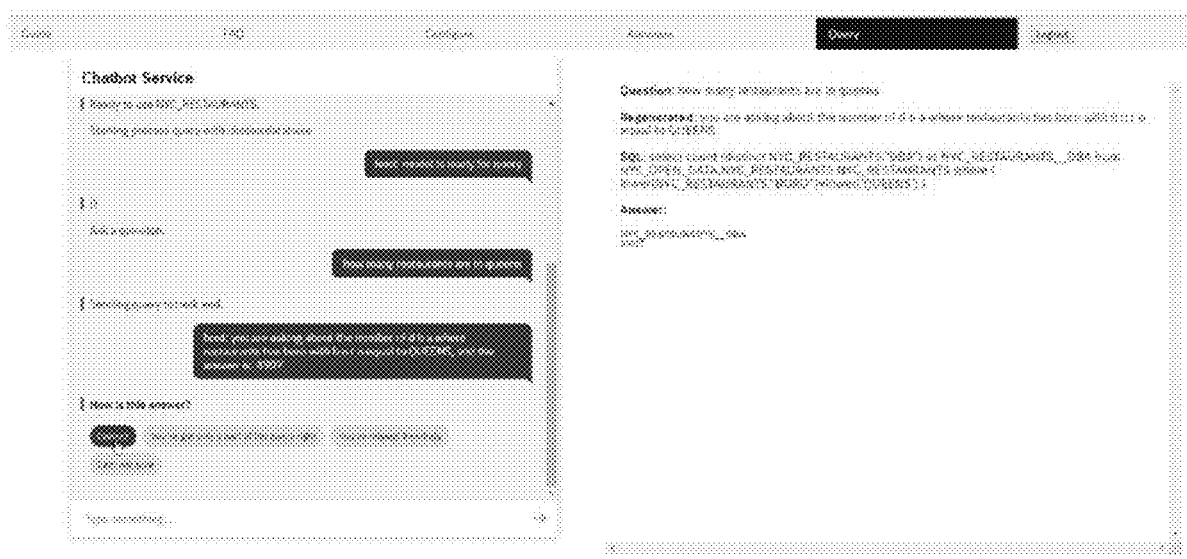

Referring to FIG. 10, the user has selected "Query" from the menu bar at the top, and the chatbot outputs.

Ready to use NYC_RESTAURANTS.
Starting process query with chosen database.

and the host outputs that the model is ready for query. The chatbot service prompts the user to ask a question. In the example of FIG. 10. the user enters "how many restaurants are in queens", which is echoed on the right side after the heading "Question:". The chatbot responds with "sending query to back end", and the host outputs "you are asking about the number of dba where restaurants has boro with boro equal to QUEENS, and the answer is: 4907". The host's rephrasing of the query is echoed on the right side after the heading "Regenerated:", followed by the equivalent SQL for querying the database, followed by the heading "Answer", and the answer: "NYC_RESTAURANTS_DBA 4907". On the left side, the chatbot prompts the user with "How is the answer?", followed by four buttons. In this example, the user selects the "Correct" button.

Figure 11:
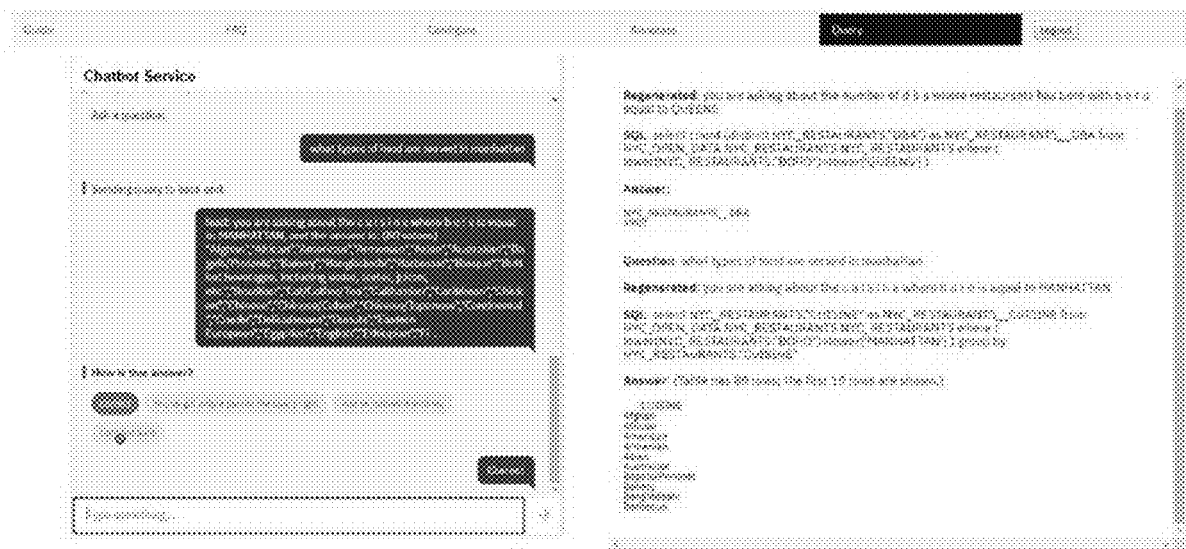
Figure 12:
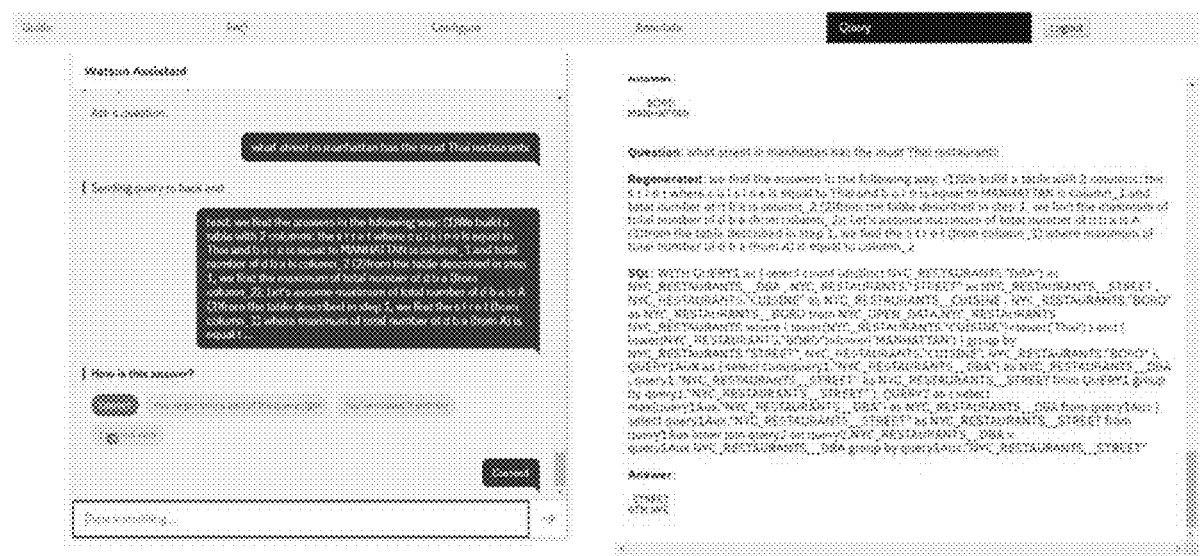

Referring to FIG. 11, the chatbot service prompts the user to ask another question. In the example of FIG. 11, the user enters "what types of food are served in manhattan", and the steps described with reference to FIG. 10 are repeated. The host outputs a rephrasing of the question, the SQL query to the database, and the answer, and the chatbot prompts the user with "How is the answer?", followed by four buttons. In this example, the user selects the "Correct" button.

Figure 14:
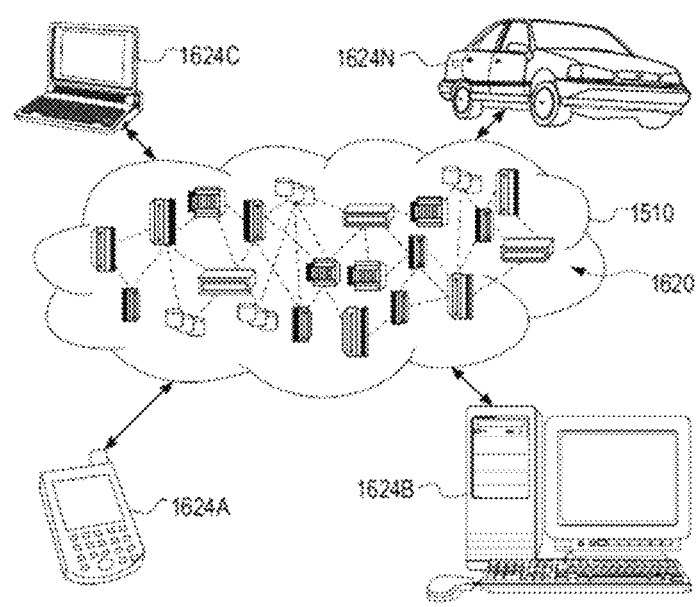
FIG. 14 shows an exemplary cloud computing environment according to embodiments of the disclosure.

FIG. 14 illustrates a further example of the user asking questions to query the conversation service. In FIG. 14, the question is "what street in Manhattan has the most Thai restaurants". Other possible questions include, for example, "what restaurants are on Broadway in Manhattan" or "what are the names and phone numbers of Italian restaurants in Queens", etc.

If an answer is incorrect or partially correct, the authoring service repeats the steps of outputting to the user a question requesting an alternative description of the subject matter of the table or another column of the table, and receives a natural language description of the subject matter of the able or another column in the table, for one or more columns of the table. The alternative description of the subject matter of the table and the natural language description of the one or more columns in the table are translated and incorporated into the conversation service.

According to an embodiment, the user continues this process of querying the conversation service until the user is satisfied that it is working correctly. However, if the user determines that the conversation service is not quite satisfactory, the user can select the "Annotate" button from the menu bar and go back to annotating the database for the conversation service.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing enviro invent now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction e.g., country, state, or datacenter).

Rapid elasticity: capabilities can be rapidly and elastically provisioned, in sonic cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by, leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
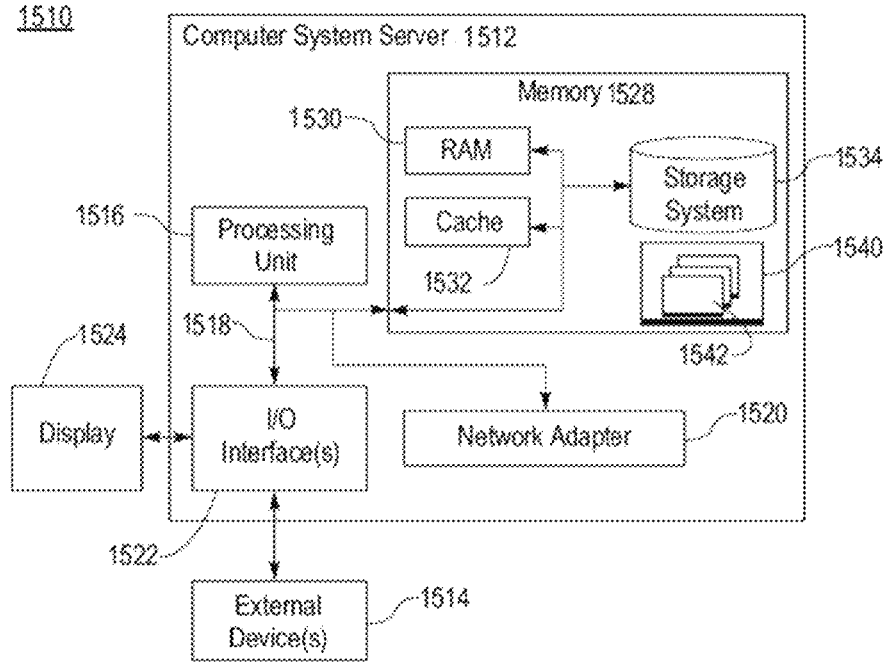
FIG. 13 is a schematic of an exemplary cloud computing node that implements an embodiment of the disclosure.

Referring now to FIG. 13, a schematic of an example of a cloud computing node is shown. Cloud computing node 1510 is only one example of a suitable cloud computing node and is not intended to suggest any limitation as to the scope of use or functionality of embodiments of the disclosure described herein. Regardless, cloud computing node 1510 is capable of being implemented and/or performing any of the functionality set forth hereinabove.

In cloud computing node 1510 there is a computer system/server 1512, which is operational with numerous other general purpose or special purpose computing system environments or configurations. Examples of well-known computing systems, environments, and/or configurations that may be suitable for use with computer system/sever 1512 include, but are not limited to, personal computer systems, server computer systems, thin clients, thick clients, handheld or laptop devices, multiprocessor systems, microprocessor-based systems, set top boxes, programmable consumer elect tonics, network PCs, minicomputer systems, mainframe computer systems, and distributed cloud computing environments that include any of the above systems or devices, and the like.

Computer system/server 1512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are finked through a communications network. In a distributed cloud computing environment, program modules may be located in both local and remote computer system storage media including memory storage devices.

As shown in FIG. 13, computer system/server 1512 in cloud computing node 1510 is shown in the form of a general-purpose computing device. The components of computer system/server 1512 may include, but are not limited to, one or more processors or processing units 1516, a system memory 1528, and a bus 1518 that couples various system components including system memory 1528 to processor 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component interconnect (PCI) bus.

Computer system/server 1512 typically includes a variety of computer system readable media, Such media may be any available media that is accessible by computer system/server 1512, and it includes both volatile and non-volatile media, removable and non-removable media.

System, memory 1528 can include computer system readable media in the form of volatile memory, such as random access memory (RAM) 1530 and/or cache memory 1532. Computer system/server 1512 may father include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the disclosure.

Program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the disclosure as described herein.

Computer system/server 1512 may also communicate with one or more external devices 1514 such as a keyboard, a pointing device, a display 1524, etc.; one or more devices that enable a user to interact with computer system/server 1512; and/or any devices (e.g., network card, modem, etc.) that enable computer system/server 1512 to communicate with one or more other computing devices. Such communication can occur via Input Output (I/O) interfaces 1522. Still yet, computer system server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that 113 although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

Referring now to FIG. 14, illustrative cloud computing environment 1620 is depicted. As shown, cloud computing environment 1620 comprises one or more cloud computing nodes 1510 with which local computing devices used by cloud consumers, such as, for example, personal digital assistant (PDA) or cellular telephone 1624A, desktop computer 1624B, laptop computer 1624C, and/or automobile computer system 1624N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1620 to offer infrastructure, platforms and/or software as services for which a cloud consumer does not need to maintain resources on a local computing device. It is understood that the types of computing devices 1624A-N shown in FIG. 14 are intended to be illustrative only and that computing nodes 1510 and cloud computing environment 1620 can communicate with any type of computerized device over any type of network and/or network addressable connection (e.g. using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method of authoring a conversation service for an existing chatbot and a database, comprising:
   receiving, from a user though an interface of the chatbot, a selection of a database, and connecting an authoring service of the chatbot to a table in the database, wherein the table comprises a plurality of rows and a plurality of columns;
   outputting, from the authoring service through the chatbot's interface to the user, a question requesting a description of a subject matter of the table;
   receiving, by the authoring service from the chatbot's interface, the description of the subject matter of the table, wherein the description includes single words or lists of grammatically unrelated words;
   outputting, from the authoring service through the chatbot's interface to the user, a question requesting an identification of a key column of the table that contains values that represent the subject matter of the table;
   receiving, by the authoring service from the chatbot's interface, the identification of the key column of the table;
   outputting, from the authoring service through the chatbot's interface to the user, a question requesting a semantic type of a subject matter of the table;
   receiving, by the authoring service from the chatbot's interface, the description of the semantic type of the subject matter of the table;
   outputting, from the authoring service through the chatbot's interface to the user, a question requesting which values of the table that are calculable;
   receiving, by the authoring service from the chatbot's interface, which of the values of the table that are calculable;
   outputting, from the authoring service through the chatbot's interface to the user, a question requesting a description of another column of the table;
   receiving, by the authoring service from the chatbot's interface, a description of another column in the table, wherein the description of another column in the table includes single words or lists of grammatically unrelated words and is translated by the natural language query service into the conversation service;
   translating, by a natural language query service, the single words or lists of grammatically unrelated words of the description of the subject matter of the table, the key column of the table, the semantic type of the subject matter, the calculable values, and the description of another column into the conversation service, wherein the conversation service includes SQL statements suitable for querying the database table; and
   outputting, from the authoring service through the chatbot's interface to the user, feedback that summarizes the description of the subject matter of the table, the identification of the key column of the table, and a natural language description of another column in the table.

2. The method of claim 1, further comprising repeating:
   outputting, from the authoring service through the chatbot's interface to the user, a question requesting a description of another column of the table; and
   receiving, by the authoring service from the chatbot's interface, a description of another column in the table for each column in the table.

3. The method of claim 1, further comprising:
   outputting, from the conversation service through the chatbot's interface to the user, a prompt for a question from the user that concerns the subject matter of the table;
   receiving by the authoring service from the chatbot's interface a question from the user that concerns the subject matter of the table;
   outputting, from the conversation service through the chatbot's interface to the user, an answer to the question received from the user; and
   receiving by the authoring service from the chatbot's interface an indication from the user of whether the answer is correct, only partially correct, or incorrect.

4. The method of claim 3, further comprising, in response to an incorrect or partially correct answer, repeating:
   outputting, from the authoring service through the chatbot's interface to the user, a question requesting an alternative description of the subject matter of the table or another column of the table;
   receiving, by the authoring service from the chatbot's interface, a description of the subject matter of the table or another column in the table, for one or more columns of the table, wherein the description of the subject matter includes single words or lists of grammatically unrelated words; and
   translating, by the natural language query service, the single words or lists of grammatically unrelated words of the description of the subject matter of the table and the description of the one or more columns in the table into the conversation service.

5. A system of authoring a conversation service for an existing chatbot and a database, comprising:
   a chatbot;
   an authoring service that guides a user through a process of building the conversational service for the chatbot;
   a database, wherein the database contains a table to which the authoring service is connected;
   a natural language query service that performs natural language processing on answers provided by the user to the authoring service and generates SQL queries for the database service; and
   an interface through which the user communicates with the chatbot and the authoring service,
   wherein the authoring service:
     outputs, through the interface to the user, a question requesting a description of a subject matter of the table,
     receives, from the user through the interface, the description of the subject matter of the table, wherein the description includes single words or lists of grammatically unrelated words,
     outputs, to the user through the interface, a question requesting an identification of a key column of the table that contains values that represent the subject matter of the table,
     receives, from the user through the interface, the identification of the key column of the table,
     outputs, to the user through the interface, a question requesting a semantic type of a subject matter of the table;
     receives, from the user through the interface, the description of the semantic type of the subject matter of the table;
     outputs, from the authoring service through the chatbot's interface to the user, a question requesting which values of the table that are calculable;
     receives, by the authoring service from the chatbot's interface, which of the values of the table that are calculable;
     outputs, from the authoring service through the chatbot's interface to the user, a question requesting a description of another column of the table;
     receives, by the authoring service from the chatbot's interface, a description of another column in the table, wherein the description of another column in the table includes single words or lists of grammatically unrelated words and is translated by the natural language query service into the conversation service;
     wherein the natural language query service translates the single words or lists of grammatically unrelated words of the description of the subject matter of the table, the key column, the semantic type of the subject matter, the calculable values, and the description of another column into the conversation service, wherein the conversation service includes SQL statements suitable for querying the database table; and
     outputs, from the authoring service through the chatbot's interface to the user, feedback that summarizes the description of the subject matter of the table, the identification of the key column of the table, and a natural language description of another column in the table.

6. The system of claim 5, wherein the user interface is a graphical user interface, and further comprising cloud storage.

7. The system of claim 5, wherein the authoring service repeats:
   outputting to the user through the interface a question requesting an alternative description of the subject matter of the table or another column of the table; and
   receiving from the user through the interface a description of the subject matter of the table or another column in the table for each column in the table.

8. The system of claim 5, wherein the conversation service:
   outputs to the user through the interface a prompt for a question from the user that concerns the subject matter of the table;
   receives from the user through the interface a question that concerns the subject matter of the table;
   outputs to the user through the interface an answer to the question received from the user; and
   receives from the user through the interface an indication of whether the answer is correct, only partially correct, or incorrect.

9. The system of claim 8, wherein the authoring service repeats, in response to an incorrect or partially correct answer:
   outputting, from the authoring service to the user through the interface, a question requesting an alternative description of the subject matter of the table or another column of the table;

receiving, by the authoring service through the interface, a description of the subject matter of the table or another column in the table, for one or more columns of the table; and translating, by the natural language query service, the description of the subject matter of the table and the natural language description of the one or more columns in the table into the conversation service.

10. A non-transitory program storage device readable by a computer, tangibly embodying a program of instructions executed by the computer to perform a method of authoring a conversation service for an existing chatbot and a database, the method comprising:

receiving, from a user though an interface of the chatbot, a selection of a database, and connecting an authoring service of the chatbot to a table in the database, wherein the table comprises a plurality of rows and a plurality of columns;

outputting, from the authoring service through the chatbot's interface to the user, a question requesting a description of a subject matter of the table;

receiving, by the authoring service from the chatbot's interface, the description of the subject matter of the table, wherein the description includes single words or lists of grammatically unrelated words;

outputting, from the authoring service through the chatbot's interface to the user, a question requesting an identification of a key column of the table that contains values that represent the subject matter of the table;

receiving, by the authoring service from the chatbot's interface, the identification of the key column of the table;

outputting, from the authoring service through the chatbot's interface to the user, a question requesting a semantic type of a subject matter of the table;

receiving, by the authoring service from the chatbot's interface, the description of the semantic type of the subject matter of the table;

outputting, from the authoring service through the chatbot's interface to the user, a question requesting which values of the table that are calculable;

receiving, by the authoring service from the chatbot's interface, which of the values of the table that are calculable;

outputting, from the authoring service through the chatbot's interface to the user, a question requesting a description of another column of the table;

receiving, by the authoring service from the chatbot's interface, a description of another column in the table, wherein the description of another column in the table includes single words or lists of grammatically unrelated words and is translated by the natural language query service into the conversation service;

translating, by a natural language query service, the single words or lists of grammatically unrelated words of the description of the subject matter of the table, the key column of the table, the semantic type of the subject matter, the calculable values, and the description of another column into the conversation service, wherein the conversation service includes SQL statements suitable for querying the database table; and outputting, from the authoring service through the chatbot's interface to the user, feedback that summarizes the description of the subject matter of the table, the identification of the key column of the table, and a natural language description of another column in the table.

11. The non-transitory computer readable program storage device of claim 10, the method further comprising repeating:

outputting, from the authoring service through the chatbot's interface to the user, a question requesting a description of another column of the table and receiving, by the authoring service from the chatbot's interface, a natural language description of another column in the table for each column in the table.

12. The non-transitory computer readable program storage device of claim 10, the method further comprising:

outputting, from the conversation service through the chatbot's interface to the user, a prompt for a question from the user that concerns the subject matter of the table;

receiving by the authoring service from the chatbot's interface from the user a question from the user that concerns the subject matter of the table;

outputting, from the conversation service through the chatbot's interface to the user, an answer to the question received from the user; and receiving by the authoring service from the chatbot's interface an indication from the user of whether the answer is correct, only partially correct, or incorrect.

13. The non-transitory computer readable program storage device of claim 12, the method further comprising, in response to an incorrect or partially correct answer, repeating:

outputting, from the authoring service through the chatbot's interface to the user, a question requesting an alternative description of the subject matter of the table or another column of the table;

receiving, by the authoring service from the chatbot's interface, a description of the subject matter of the table or another column in the table, for one or more columns of the table, wherein the description of the subject matter includes single words or lists of grammatically unrelated words; and translating, by the natural language query service, the single words or lists of grammatically unrelated words of the description of the subject matter of the table and the description of the one or more columns in the table into the conversation service.

* * * * *